US009231914B2

United States Patent
Shim et al.

(10) Patent No.: US 9,231,914 B2
(45) Date of Patent: Jan. 5, 2016

(54) MOBILE DEVICE SECURITY MANAGEMENT SYSTEM

(71) Applicant: LG CNS CO., LTD., Seoul (KR)

(72) Inventors: Sun Hwa Shim, Seoul (KR); Ja Yoon Kong, Seoul (KR); Yong Seock Pai, Seoul (KR); Gwang Sik Suh, Seoul (KR); Byung Chul Lim, Seoul (KR); Dong Go Jang, Seoul (KR); Man Ho Han, Seoul (KR)

(73) Assignee: LG CNS CO., LTD., Seoul (KR)

( * ) Notice: Subject to any disclaimer, the term of this patent is extended or adjusted under 35 U.S.C. 154(b) by 22 days.

(21) Appl. No.: 13/898,825

(22) Filed: May 21, 2013

(65) Prior Publication Data

US 2014/0157353 A1 Jun. 5, 2014

(30) Foreign Application Priority Data

May 31, 2012 (KR) ........................ 10-2012-0058863

(51) Int. Cl.
*H04L 29/06* (2006.01)
*H04W 12/08* (2009.01)

(52) U.S. Cl.
CPC ............ *H04L 63/0263* (2013.01); *H04L 63/20* (2013.01); *H04W 12/08* (2013.01); *H04L 63/104* (2013.01); *H04L 63/107* (2013.01); *H04L 63/1441* (2013.01)

(58) Field of Classification Search
CPC ...... H04W 12/06; H04W 12/08; H04L 63/10; H04L 63/20; G06F 21/10
USPC ............................................................ 726/3
See application file for complete search history.

(56) References Cited

U.S. PATENT DOCUMENTS

| | | | |
|---|---|---|---|
| 7,159,120 B2 * | 1/2007 | Muratov et al. ............... | 713/182 |
| 7,665,125 B2 | 2/2010 | Heard et al. | |
| 2003/0065934 A1 * | 4/2003 | Angelo et al. ................ | 713/200 |
| 2004/0143750 A1 * | 7/2004 | Kulack et al. ................. | 713/200 |
| 2006/0199598 A1 | 9/2006 | Lee et al. | |
| 2007/0143824 A1 | 6/2007 | Shahbazi | |
| 2007/0232265 A1 | 10/2007 | Park et al. | |
| 2012/0309354 A1 * | 12/2012 | Du ................ | 455/411 |
| 2014/0068247 A1 * | 3/2014 | Davis et al. ................... | 713/155 |

FOREIGN PATENT DOCUMENTS

KR 1020110040934 4/2011

OTHER PUBLICATIONS

KR Application No. 10-2012-0058863, Office Action, Feb. 28, 2014, 8 pages.

* cited by examiner

*Primary Examiner* — Dao Ho
(74) *Attorney, Agent, or Firm* — Hunter E. Webb; Keohane & D'Alessandro, PLLC

(57) ABSTRACT

A method for managing the security of a client device in a mobile device management system (MDMS) comprises receiving a security policy at a client device, applying the security policy on the client device, determining an occurrence of a security policy event, determining a violation based on the occurrence of the security policy event and applying different security controls based on predefined elapsed times on the client device.

17 Claims, 4 Drawing Sheets

MOBILE DEVICE SECURITY MANAGEMENT SYSTEM

BACKGROUND

1. Technical Field

The present invention relates generally to security management of a mobile device and, more particularly, to an enterprise-wide, time-dependent security management system for mobile devices based on security policies.

2. Related Art

When it comes to using mobile devices (e.g., smart phones, cell phones, laptop computers, notebook computers, Tablet PCs, Personal Digital Assistants (PDAs), and the like) as repositories and/or stewards of sensitive personal information (e.g., bank account details, Social Security numbers, credit card numbers, debit card numbers, etc.) and business information (e.g., access to business e-mail messages, confidential enterprise data, etc.), the number one concern for most users is theft or loss of the mobile device. For example, because cell phones are utilized much more often than one's wallet, one's cell phone is typically easier to lose than one's wallet.

A drawback of existing protection schemes is the requirement that a security application is used only when the event (i.e., theft, loss, etc.) occurs which limits the convenience of the mobile device. For example, when a mobile device is lost, the user may need to change information related to the mobile device (e.g., by entering a valid password) immediately or a security breach may occur. Enterprises/companies may be greatly affected with the loss of a mobile device. A new approach to an enterprise-level mobile device security management system is needed. Heretofore, several unsuccessful attempts have been made to address these shortcomings.

United States Patent Application US20060199598 describes a method that includes wirelessly receiving a text string at a mobile phone and parsing the text string to obtain security configuration data of the mobile phone and determining whether a code in the security configuration data matches a corresponding code in the mobile phone.

United States Patent Application US20070143824 describes a system and method for enforcing security parameters that collects information from a source relating to a mobile device and, based on the collected information, an identity status for the mobile device is determined that uniquely identifies the mobile device and distinguishes it from other mobile devices.

United States Patent Application US20070232265 describes a system and a method of security management of a wireless mobile device capable of reducing damage caused by a security attack and a malicious code in the wireless mobile device by appropriately interoperating with a network switching center (NSC).

U.S. Pat. No. 7,665,125 describes a wireless security system that includes a client module deployed on a wireless device, a network module, and a server module in which the client module is adapted to authenticate authorized wireless devices independent of the network module and the server module.

Therefore, what is needed is a solution that addresses at least one of the deficiencies of the current art.

SUMMARY

In general, embodiments described herein provide approaches relating generally to location position management of mobile devices. Specifically, a mobile device management system is provided for securing a mobile device based on a predefined security policy. The mobile device receives a security policy created at a server, applies the security policy, and monitors the status of the security policy. When a security violation of the security policy is detected, a security control measure is applied based on predefined elapsed times on a client.

One aspect of the present invention includes a method for managing the security of a mobile device in a mobile device management system (MDMS), the method comprising the computer-implemented steps of: receiving a security policy at a client device; applying the security policy on the client device; determining an occurrence of a security policy event; determining a violation based on the occurrence of the security policy event; and applying different security controls based on predefined elapsed times on the client device.

Another aspect of the present invention provides a mobile device management system for securing a client device, comprising: a client device, comprising: a memory medium comprising instructions; a bus coupled to the memory medium; and a processor coupled to the bus that when executing the instructions causes the client device to: receive a security policy; apply the security policy; determine an occurrence of a security policy event; determine a violation based on the occurrence of the security policy event; and apply different security controls based on predefined elapsed times on the client device.

Another aspect of the present invention provides a computer-readable storage medium storing computer instructions which, when executed, enables a computer system to secure a client device in a mobile device management system (MDMS), the computer instructions comprising: receiving a security policy at a client device; applying the security policy on the client device; determining an occurrence of a security policy event; determining a violation based on the occurrence of the security policy event; applying different security controls based on predefined elapsed times.

BRIEF DESCRIPTION OF THE DRAWINGS

These and other features of this invention will be more readily understood from the following detailed description of the various aspects of the invention taken in conjunction with the accompanying drawings in which.

Figure 1:
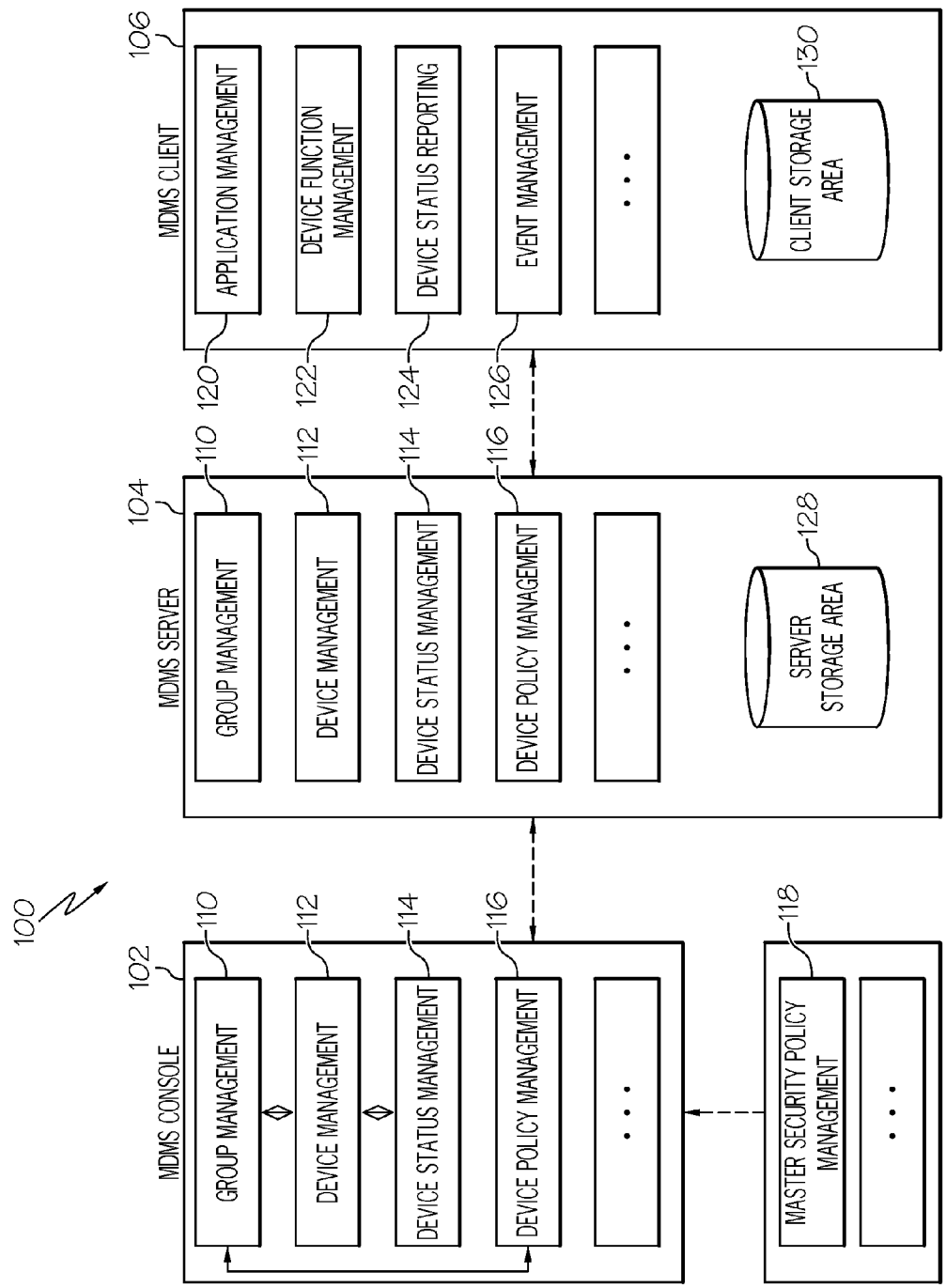
FIG. 1 shows a representation of an exemplary enterprise mobile device management system (MDMS) diagram according to illustrative embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments will now be described more fully herein with reference to the accompanying drawings, in which exemplary embodiments are shown. Embodiments described herein provide approaches relating generally to location position management of mobile devices. Specifically, a mobile device management system is provided for securing a mobile device based on a predefined security policy. The mobile device receives a security policy created at a server, applies the security policy, and monitors the status of the security policy. When a security violation of the security policy is detected, a security control measure is applied after a predefined amount of time has elapsed on a client device.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

The term "enterprise" used herein may refer to any organization, such as a a business entity (e.g., firm, company, etc.) that engages in business activities, such as the sale of a product or a service. Alternatively, the enterprise may be a non-profit entity, such as a charity.

The term "group" refers to any logical grouping made by an enterprise for distinguishing among different types of persons or employees. For example, a group may comprise persons within a project team, department, geographical location (e.g., particular floor, building, branch, or city), particular job role, or the like.

Referring now to FIG. 1, a representation of an enterprise-wide, policy-based mobile device management system (MDMS) 100 in which aspects of the illustrative embodiments may be implemented is shown. MDMS 100 comprises MDMS console 102, MDMS server 104, and MDMS client 106. Although FIG. 1 depicts one console, one server, and one client, it is understood that MDMS 100 may contain any suitable number of consoles, servers, and/or clients to meet the needs of the enterprise.

MDMS console 102 is the control monitoring station including a text entry and a display used for system administration. In one example, MDMS console 102 may comprise one or more physical devices consisting of an input device and a display screen. The display screen may include any display device, such as a cathode ray tube (CRT), liquid crystal display (LCD), light emitting diode (LED), projection, touch screen, or other display element or panel. The input device may include a computer keyboard, a keypad, a mouse, a pen, a joystick, or any other type of input device by which an MDMS user may interact with and respond to information on the display screen.

MDMS server 104 interfaces with MDMS console 102 to allow secure remote monitoring, support, and management of MDMS client 106 over a communications network by a user (e.g., authorized MDMS administrator). The MDMS console 102 provisions, secures, and monitors all registered enterprise mobile devices in a consolidated fashion. MDMS console 102 monitors the policy status of mobile devices in real time. Proper action is then taken based on the policy statuses of the mobile devices. MDMS console 102 interfaces with MDMS server 104 to perform the following functions: group management 110, device management 112, device status management 114, and device policy management 116. The functions are discussed in greater detail with reference to FIGS. 2-4 below.

In general, MDMS server 104 is responsible for executing policies and monitoring. It allows administrators to manage endpoint mobile devices, such as MDMS client 106. MDMS server 104 allows administrators to set control policies for specified mobile devices and the policies will be automatically distributed to particular mobile devices immediately and then executed instantly. In one example, all triggered events may be logged so that administrators can trace the details through the MDMS console 102 easily.

MDMS server 104 may communicate with any number of mobile devices, such as MDMS client 106 using a communications protocol over a wireless communications network. MDMS client 106 may include any mobile device such as a smart phone, cell phone, personal digital assistant (PDA), laptop, or the like, that is operable within a wireless communications network. The wireless communications network comprises any of: a wireless local area network (LAN), a wireless wide area network (WAN), a wireless peer-to-peer communications network, a code division multiple access (CDMA) communications network, a time division multiple access (TDMA) communications network, a global system for mobile communications (GSM) communications network, and the wireless Internet. The communications network is operable to communicate data (including security policy and status information) between MDMS server 104 and MDMS client 106.

In one example, MDMS console 102 may interface with a separate device to perform master security policy management 118 function. In other examples, MDMS console 102 may interface with MDMS server 104 to perform the master security policy management 118 function. Master security policy management 118 may include managing all or a subset of the security policies for the enterprise including creating, modifying, and/or deleting one or more policies based on the needs of the enterprise.

In some embodiments, MDMS server 104 may include server storage area 128 and MDMS client 106 may include client storage area 130. Each storage area may include a database or set of databases having data stored in any suitable format necessary to execute the functions of the respective devices (i.e., MDMS server 104 and MDMS client 106).

Figure 2:
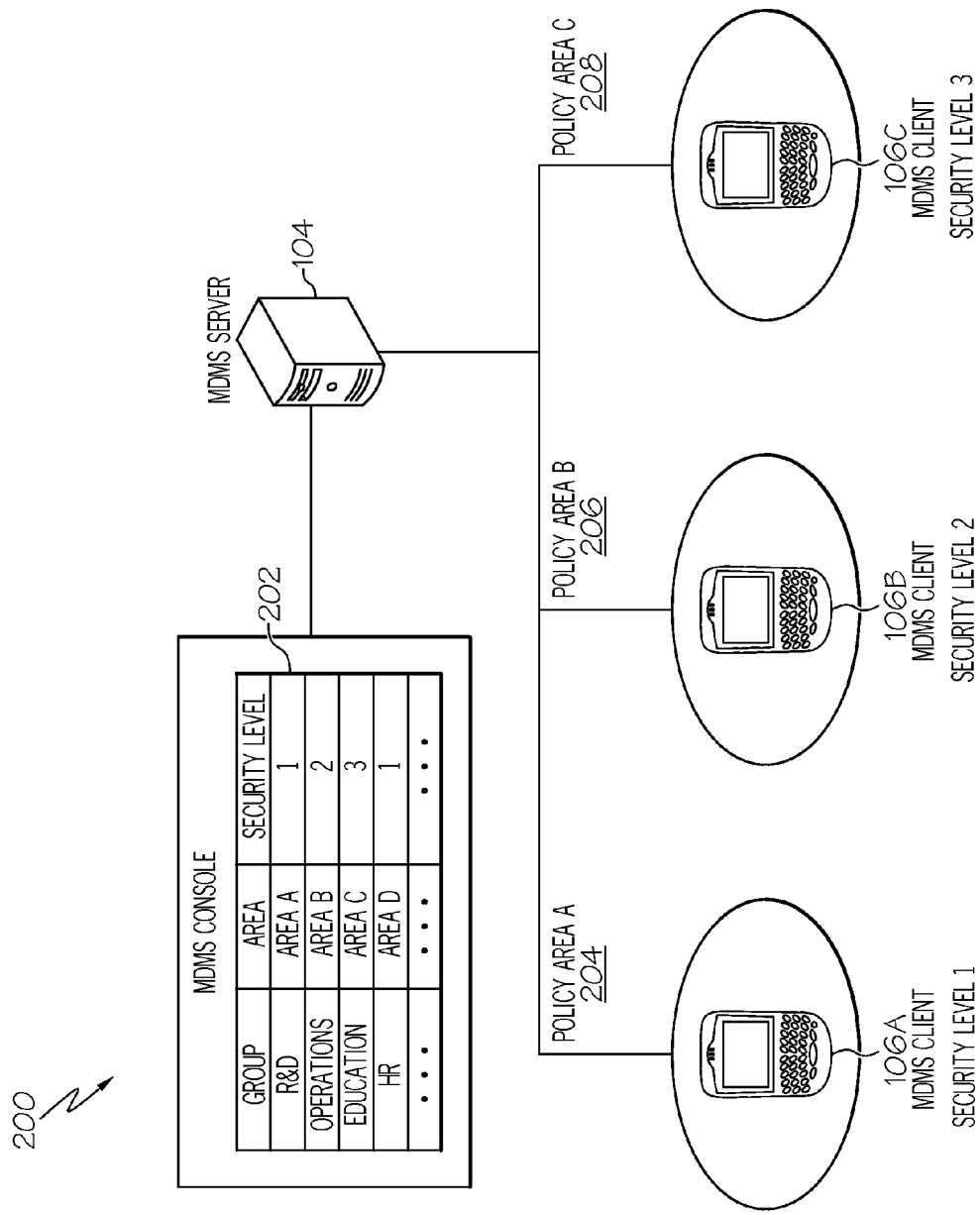
FIG. 2 shows a representation of an exemplary MDMS implementation including a security policy setup for a number of mobile clients according to illustrative embodiments of the present invention.

FIG. 2 shows a representation of an exemplary MDMS implementation including security policy setup for a number of mobile clients according to illustrative embodiments. Many enterprises allow staff to use smart phones and tablets to connect to their corporate systems. A number of these enterprises have reported security breaches caused by their respective staff, at times resulting in lost or leaked confidential information. FIG. 2 depicts MDMS 200 including MDMS console 102, MDMS server 104, and three MDMS clients 106A-C. As shown, each MDMS client 106A-C is a smart phone.

MDMS console 102 shows security policy table 202. An authorized MDMS administrator or security manager may establish various policies based on different levels. The different levels may correspond to the needed security levels of the different groups and/or areas of the enterprise. The MDMS security manager establishes a security policy through the MDMS console 102. MDMS server 104 creates the security policy and the security manager causes the MDMS server 104 to push the appropriate security policy to the designated MDMS client (e.g., MDMS client 106A-C).

Security policy table 202 includes three columns of data: group, area, and security level. In one example, security profiles may be group-based. In other examples, security profiles may be location-based. As shown, security policy table 202 shows the security policy setup for three groups: Research and Development (R&D), Operations Department, Education Department, and Human Resources (HR). Each enterprise may be divided into any number of "areas", with each area being assigned a security level. In one example, an area defines the workspace for a particular group. In other examples, an area may be defined using other means. R&D is located in Area A, the Operations Department is located in Area B, the Education Department is located in Area C, and HR is located in Area D. A security level is assigned to each group. In this example, R&D and HR are assigned a security level of 1. The Operations Department is assigned a security level of 2 and the Education Department is assigned a security level of 3. R&D and HR may be assigned a higher security level than the other areas due to the sensitive and confidential data that may be located within the R&D and HR groups. A security level may be represented by a unique number, symbol, character, character string, or any combination thereof.

Three distinct wireless areas are shown in MDMS 200 with each area having an assigned security level. The three areas are: policy area A 204 (having security level of 1), policy area B 206 (having security level of 2), and policy area C 208 (having security level of 3). MDMS client 106A is located within policy area A 204. MDMS client 106B is located within policy area B 206. MDMS client 106C is located within policy area C 208.

Figure 3:
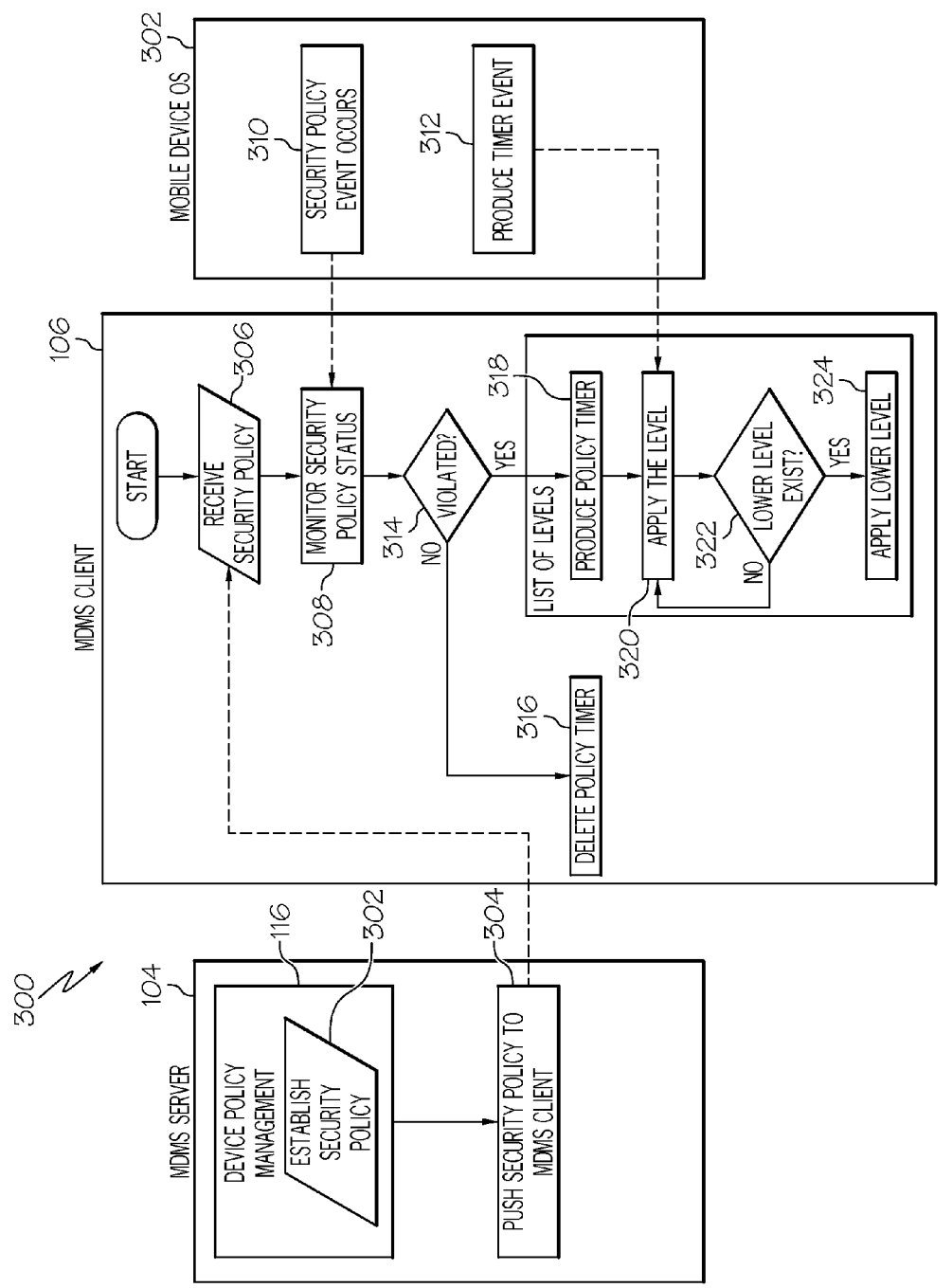
FIG. 3 shows an operational flow chart for providing a mobile device management system (MDMS) according to illustrative embodiments of the present invention.

Referring now to FIG. 3, an exemplary process flow diagram for providing a mobile device management system (MDMS) according to illustrative embodiments is shown in greater detail. An example MDMS server 104 and MDMS client 106 having MDMS client operating system (OS) 302 are depicted. As shown, device management policy 116 establishes a security policy based on the needs of the enterprise at 302. At 304, the security policy is pushed to a MDMS client 106. At 306, MDMS client 106 receives the security policy and applies it to the device. At 308, MDMS client 106 monitors the security policy status. Mobile client OS 302 detects a security policy event at 310. At 312, a timer event is produced. The timer event begins a running clock of elapsed time beginning when the security policy change event occurred.

At 314, a determination is made as to whether the security policy change event amounts to a security violation or breach. A security policy event and/or potential security violation may include, but is not limited to, a device loss, a password lock after a predefined number of incorrect entries, or deletion/modification of an existing application. If the security policy change event is determined to not be a security violation, the timer event is deleted at 316. If the security policy change event is determined to indeed be a security violation, the timer event is checked to determine the amount of time that has elapsed since the security violation began.

At 318, the policy timer is produced. After a security violation has been determined, the security measures taken are time-dependent. If an appropriate action is not taken by the user of the MDMS client 106, successive security measures which increase in severity will be taken by the MDMS client 106. At 320, based on the elapsed time of the policy timer, a corresponding control level is applied to the MDMS client 106. At 322 and 324, MDMS client 106 continues to determine whether additional control levels should be applied and applies each control level at the appropriate time based on the timing associated with each respective control level. In one embodiment, different security controls may be applied based on predetermined elapsed times on the MDMS 106. For example, when a certain security control is applied based on a certain elapsed time, a security control may lower a security level and the lowered security level may be applied on the MDMS 106.

Figure 4:
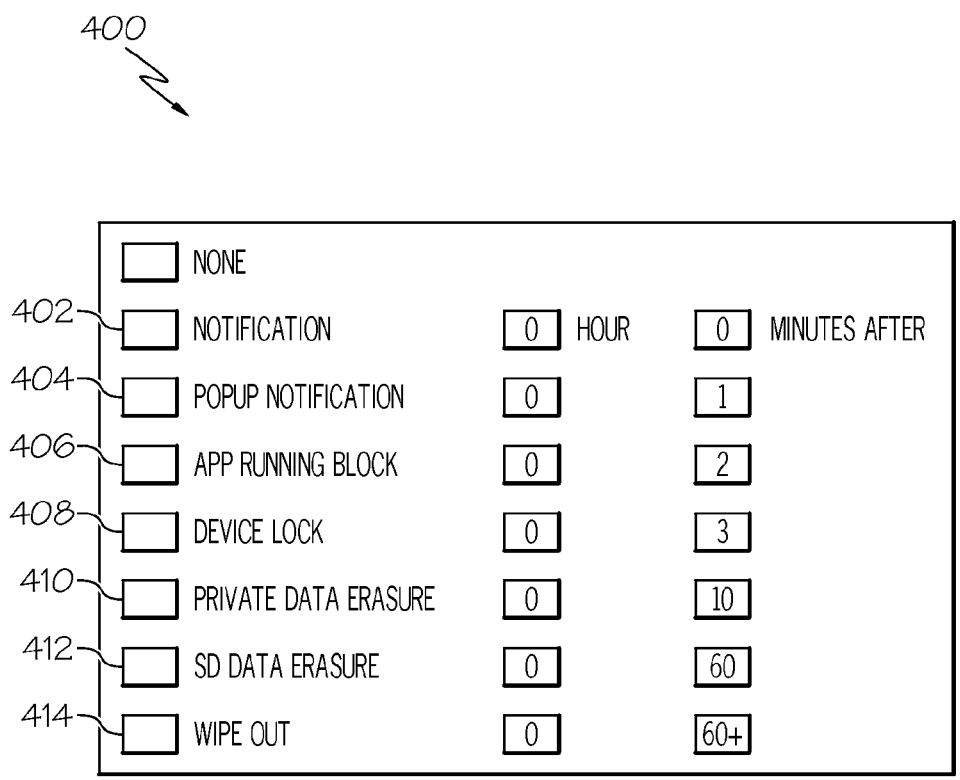
FIG. 4 shows an exemplary list of control levels according to illustrative embodiments of the present invention.

FIG. 4 shows an exemplary list of control levels according to illustrative embodiments of the present invention. For example, control level 402 may generate a notification immediately. Control level 404 may generate a popup notification after a minute has elapsed. Control level 406 may block an application that is running after 2 minutes have elapsed. Control level 408 may lock the device after 3 minutes have elapsed. Control level 410 may erase private data stored on the device after 10 minutes have elapsed. After 60 minutes have elapsed, control level 412 may erase any secure digital (SD) data. After more than 60 minutes have elapsed, control level 414 may completely erase all data (i.e., reformatting the device or wiping out the device) from the device.

The control levels discussed above are illustrative only and not intended to be limiting. In certain embodiments, the steps described above with reference to FIG. 3 may be performed concurrently or in a different order than shown.

While shown and described herein as an MDMS solution, it is understood that the invention further provides various alternative embodiments. For example, in one embodiment, the invention provides a computer-readable/useable medium that includes computer program code to enable a computer infrastructure to provide financial transaction record generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a computer-implemented method for applying a security policy to a mobile device. In this case, a wireless infrastructure, such as implementation 100 (FIG. 1), can be provided and one or more systems for performing the processes of the invention can be obtained (e.g., created, purchased, used, modified, etc.) and deployed to the wireless infrastructure. To this extent, the deployment of a system can comprise one or more of: (1) installing program code on a mobile device, from a computer-readable medium; (2) adding one or more computing devices to the wireless infrastructure; and (3) incorporating and/or modifying one or more existing systems of the wireless infrastructure to enable the wireless infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The flowchart and block diagrams depicted in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing the security of a client device in a mobile device management system (MDMS), the method comprising:

receiving a security policy at a client device, wherein the security policy is based on at least one of a group and a location, the security policy having a plurality of predefined elapsed times comprising chronological time values and a different security control associated with each of the plurality of predefined elapsed times;
applying, by a computing device, the security policy on the client device;
determining, by a computing device, an occurrence of a security policy event;
determining, by a computing device, a violation based on the occurrence of the security policy event; and
applying, by the client device, a plurality of different security controls based on the plurality of predefined elapsed times on the client device, each of the plurality of security controls being an elevated security control;
the applying including performing on the client device, in response to each of the predefined elapsed time being reached, an action specified by a security control associated with a reached elapsed time and the applying further including:
applying a first security control having a first level when there are no security control, determining whether a second security control is exist, and
applying the second security control, wherein the second security control has a second level being higher level than the first level.

2. The method of claim 1, further comprising:
establishing, by a computing device, a security policy at a server; and
monitoring, by a computing device, a status of the security policy on the client device.

3. The method of claim 1, wherein determining a violation based on the occurrence of the security policy event comprises generating a policy timer when the violation is occurred.

4. The method of claim 2, further comprising pushing, by a computing device, the security policy from the server to the client device via a communications network.

5. The method of claim 4, wherein the communications network is a wireless network.

6. The method of claim 1, wherein the client device comprises one of a smart phone, cell phone, laptop computer, notebook computer, tablet computer, or personal digital assistant (PDA).

7. The method of claim 1, wherein the security controls comprise at least one of generating a notification, generating a popup notification, blocking an application from running, locking the client device, erasing data from the client device, or reformatting the client device.

8. A mobile device management system for securing a client device, comprising:
a client device, comprising:
a memory medium comprising instructions;
a bus coupled to the memory medium; and
a processor coupled to the bus that when executing the instructions causes the client device to:
receive a security policy, wherein the security policy is based on at least one of a group and a location, the security policy having a plurality of predefined elapsed times comprising chronological time values and a different security control associated with each of the plurality of predefined elapsed times;
apply the security policy;
determine an occurrence of a security policy event;
determine a violation based on the occurrence of the security policy event; and apply a plurality of different security controls based on the plurality of predefined elapsed times, each of the plurality of security controls being an elevated security control;

the applying including performing on the client device, in response to each of the predefined elapsed time being reached, an action specified by a security control associated with a reached elapsed time and the applying further including:

applying a first security control having a first level when there are no security control, determining whether a second security control is exist, and applying the second security control, wherein the second security control has a second level being higher level than the first level.

9. The system of claim 8, further comprising a server, wherein the server is configured to create a security policy.

10. The system of claim 9, wherein the server is further configured to push the security policy to the client device via a communications network.

11. The system of claim 10, wherein the communications network is a wireless network.

12. The system of claim 8, wherein the client device comprises one of a smart phone, cell phone, laptop computer, notebook computer, tablet computer, or personal digital assistant (PDA).

13. The system of claim 8, wherein the security controls comprise at least one of generating a notification, generating a popup notification, blocking an application from running, locking the client device, erasing data from the client device, or reformatting the client device.

14. A computer-readable storage device storing computer instructions which, when executed, enables a computer system to secure a client device in a mobile device management system (MDMS), the computer instructions comprising:

receiving a security policy at a client device, the security policy having a plurality of predefined elapsed times comprising chronological time values and a different security control associated with each of the plurality of predefined elapsed times;

applying the security policy on the client device;

determining an occurrence of a security policy event;

determining a violation based on the occurrence of the security policy event; and applying a plurality of different security controls based on the plurality of predefined elapsed times, each of the plurality of security controls being an elevated security control;

the applying including performing on the client device, in response to each of the predefined elapsed time being reached, an action specified by a security control associated with a reached elapsed time and the applying further including:

applying a first security control having a first level when there are no security control, determining whether a second security control is exist, and applying the second security control, wherein the second security control has a second level being higher level than the first level, wherein the different security controls are increasingly severe as the plurality of predefined elapsed times progress.

15. The computer-readable storage device according to claim 14, wherein the client device comprises one of a smart phone, cell phone, laptop computer, notebook computer, tablet computer, or personal digital assistant (PDA).

16. The computer-readable storage device according to claim 14, wherein at least one of the first security control or second security control comprises at least one of generating a notification, generating a popup notification, blocking an application from running, locking the client device, erasing data from the client device, or reformatting the client device.

17. The computer-readable storage device according to claim 14, wherein the security policy is associated with a group or location.

* * * * *